(12) United States Patent
Garmon

(10) Patent No.: US 12,113,844 B2
(45) Date of Patent: Oct. 8, 2024

(54) DIGITAL DATA PROCESSING

(71) Applicant: Carrier Corporation, Palm Beach Gardens, FL (US)

(72) Inventor: Richard W. Garmon, Mystic, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/446,886

(22) Filed: Sep. 3, 2021

(65) Prior Publication Data

US 2022/0086212 A1    Mar. 17, 2022

Related U.S. Application Data

(60) Provisional application No. 62/706,869, filed on Sep. 15, 2020.

(51) Int. Cl.
  *H04L 65/70* (2022.01)
  *H04L 65/75* (2022.01)
  *H04R 3/00* (2006.01)

(52) U.S. Cl.
  CPC ............ *H04L 65/70* (2022.05); *H04L 65/765* (2022.05); *H04R 3/00* (2013.01); *H04R 2420/07* (2013.01); *H04R 2499/11* (2013.01)

(58) Field of Classification Search
  CPC ......... H04L 65/70; H04L 65/765; H04R 3/00; H04R 2420/07; H04R 2499/11
  See application file for complete search history.

(56) References Cited

U.S. PATENT DOCUMENTS

| | | | |
|---|---|---|---|
| 6,724,746 B1* | 4/2004 | Linden | H04L 12/6418 370/349 |
| 8,244,313 B2 | 8/2012 | Huang | |
| 8,630,208 B1 | 1/2014 | Kjeldaas | |
| 11,258,836 B1* | 2/2022 | Ou | H04L 65/1089 |
| 2009/0284577 A1* | 11/2009 | Kumar | H04N 7/147 348/14.02 |
| 2011/0292165 A1* | 12/2011 | Berger | H04L 65/403 348/E7.083 |

(Continued)

OTHER PUBLICATIONS

Wang, et al, "Video Transcoding Method and Device", Jul. 19, 2018, CN 110740349A (English Translation), pp. 1-15 (Year: 2018).*

*Primary Examiner* — Jonathan A Bui

(74) *Attorney, Agent, or Firm* — Seager, Tufte & Wickhem, LLP

(57) ABSTRACT

A media system and a method of operating a media system are provided. The media system includes a processing device and a media receiving device. The processing device is configured to transcode a digital data (e.g., at least one of: an audio component and a video component) from a first format to a second format. The processing device is configured to transmit the digital data in the second format. The media receiving device is in communication with the processing device. The media receiving device has at least one of: an obscured mode and a mute mode, and conversely at least one of an un-obscured mode and an un-mute mode. The processing device is configured to stop transcoding and transmitting at least a portion of the digital data to the media receiving device when the media receiving device is in at least one of the obscured mode and the mute mode.

17 Claims, 3 Drawing Sheets

(56) References Cited

U.S. PATENT DOCUMENTS

| | | | | |
|---|---|---|---|---|
| 2012/0308044 A1* | 12/2012 | Vander Mey | ......... | H04M 3/566 |
| | | | | 381/104 |
| 2013/0155177 A1* | 6/2013 | Mock | ....................... | H04N 7/14 |
| | | | | 348/E7.078 |
| 2013/0159471 A1* | 6/2013 | Saada | ................. | H04L 65/4038 |
| | | | | 709/219 |
| 2018/0124136 A1* | 5/2018 | Faulkner | .................. | H04N 7/15 |

* cited by examiner

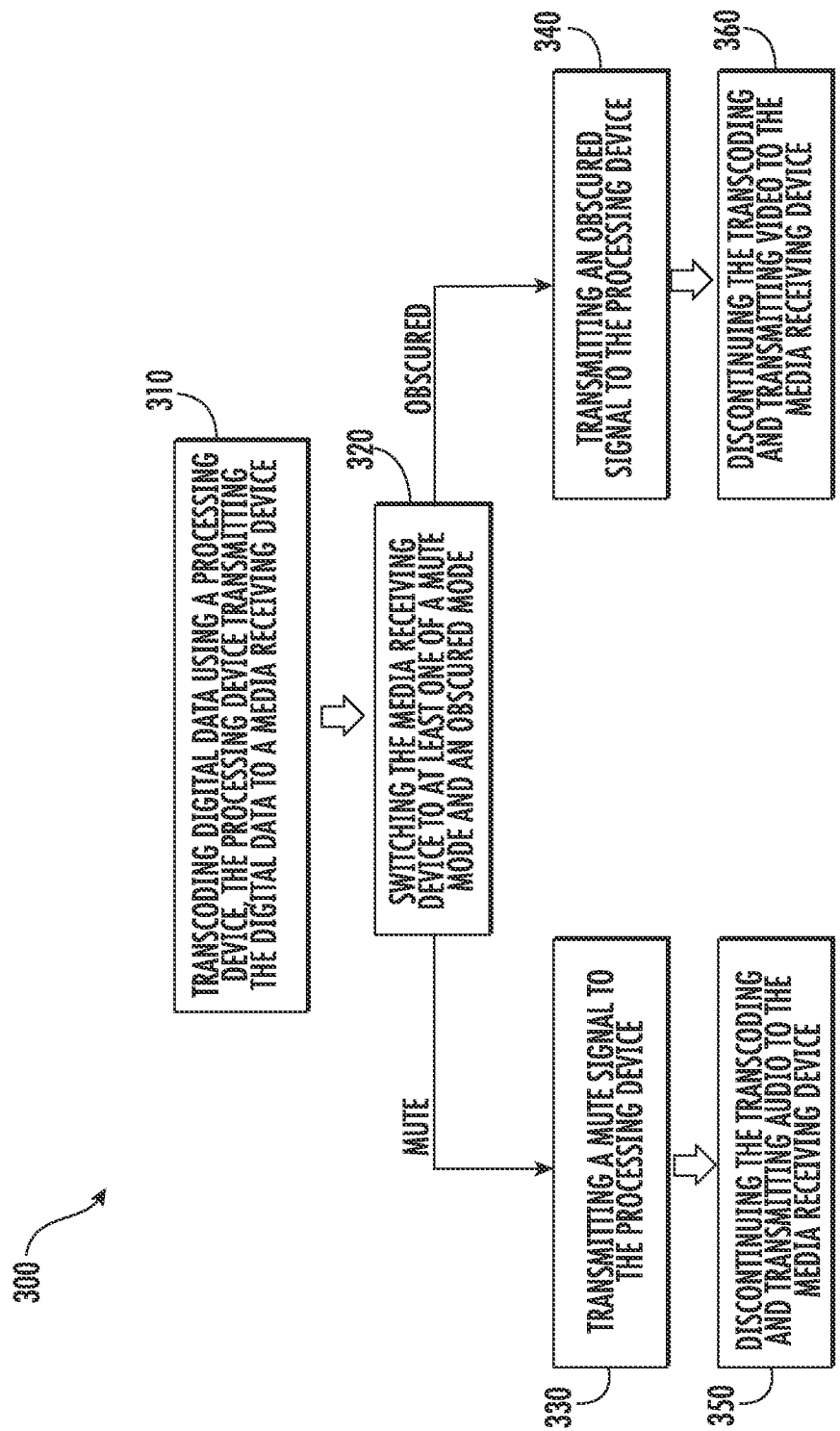

DIGITAL DATA PROCESSING

CROSS REFERENCE TO A RELATED APPLICATION

The application claims the benefit of U.S. Provisional Application No. 62/706,869 filed Sep. 15, 2020, the contents of which are hereby incorporated in their entirety.

BACKGROUND

This invention relates to the processing of digital data. More particularly, the invention relates to the unnecessary transcoding and transmitting of digital data when the receiving device is not utilizing the digital data.

Transcoding is the direct digital-to-digital conversion of one encoding to another. Transcoding may be particularly useful for video files and/or audio files. For example, transcoding may be needed in situations in which a receiving device (e.g., a mobile phone, mobile tablet, computer, etc.) does not support the original format of the original data. Transcoding is a two-step process in which the original data (e.g., which may include audio and/or video components) is decoded to an intermediate uncompressed format (e.g., PCM for audio, or YUV for video), which is then encoded into the target format (e.g., supported by the receiving device). For example, web browsers may support specific audio encoding formats, which means that web services often must transcode the audio from a source (e.g., a security camera) to a browser-supported format. Transcoding, although necessary in many instances, consumes computing cycles on the processing device (e.g., a server), and may be unnecessary if the end user (e.g., who is operating the receiving device) is not utilizing the data that is being received.

For example, if the end user has the audio muted it may not be necessary to transcode or transmit the audio components of the digital data. Likewise, if the end user has the video covered or minimized then it may not be necessary to transcode or transmit the video components of the digital data. In either case, when the end user is not utilizing the data, processing the data may unnecessarily consume computing cycles (when still being transcoded) and/or bandwidth (when still being transmitted) at the processing device (e.g., such as at the server level where the transcoding and/or transmitting commonly occurs). Current media systems do not provide a solution to reduce unnecessary transcoding and transmitting at the server level. Instead, many media systems only make adjustments at the receiving device. For example, some media players, to reduce battery consumption by the media player, shut off the processing of the received digital data when the media player is set to mute. However, this does not prevent the unnecessary transcoding and transmitting at the server level as the server is still transcoding and transmitting the digital data for the media player.

Accordingly, there remains a need for a media system and method of operating such a media system that are capable of reducing the unnecessary transcoding and transmitting of digital data when the digital data is not being utilized.

BRIEF DESCRIPTION

According to one embodiment, a media system including a processing device and a media receiving device is provided. The processing device is configured to transcode a digital audio from a first format to a second format. The processing device is configured to transmit the digital audio in the second format. The media receiving device is in communication with the processing device. The media receiving device includes a mute mode and an un-mute mode. The media receiving device is configured to transmit a mute signal to the processing device when switched to the mute mode. The processing device is configured to stop transcoding and transmitting the digital audio to the media receiving device when receiving the mute signal.

In accordance with additional or alternative embodiments, the media receiving device is configured to transmit an un-mute signal to the processing device when switched to the un-mute mode, the processing device configured to resume transcoding and transmitting the digital audio to the media receiving device when receiving the un-mute signal.

In accordance with additional or alternative embodiments, the processing device is in communication with a media output device, the media output device is configured to transmit the digital audio to the processing device in the first format.

In accordance with additional or alternative embodiments, the media output device includes a microphone configured to capture the digital audio.

In accordance with additional or alternative embodiments, the processing device includes a server, the transcoding and transmitting completed in the server.

In accordance with additional or alternative embodiments, the processing device includes at least one of: a mobile phone, a mobile tablet, and a computer, the transcoding and transmitting completed in at least one of: the mobile phone, the mobile tablet, and the computer.

In accordance with additional or alternative embodiments, the media receiving device includes at least one of: a mobile phone, a mobile tablet, and a computer.

In accordance with additional or alternative embodiments, the media receiving device includes an application, the switching between the mute mode and the un-mute mode and the transmitting of the mute signal and the un-mute signal completed in the application.

According to another aspect of the disclosure, a media system including a processing device and a media receiving device is provided. The processing device is configured to transcode a digital video from a first format to a second format. The processing device is configured to transmit the digital video in the second format. The media receiving device is in communication with the processing device. The media receiving device includes an obscured mode and an un-obscured mode. The media receiving device is configured to transmit an obscured signal to the processing device when switched to the obscured mode. The processing device is configured to stop transcoding and transmitting the digital video to the media receiving device when receiving the obscured signal.

In accordance with additional or alternative embodiments, the media receiving device is configured to transmit an un-obscured signal to the processing device when switched to the un-obscured mode, the processing device configured to resume transcoding and transmitting the digital video to the media receiving device when receiving the un-obscured signal.

In accordance with additional or alternative embodiments, the processing device is in communication with a media output device, the media output device configured to transmit the digital video to the processing device in the first format.

In accordance with additional or alternative embodiments, the media output device includes an optical lens configured to capture the digital video.

In accordance with additional or alternative embodiments, the processing device includes a server, the transcoding and transmitting completed in the server.

In accordance with additional or alternative embodiments, the processing device includes at least one of: a mobile phone, a mobile tablet, and a computer, the transcoding and transmitting completed in at least one of: the mobile phone, the mobile tablet, and the computer In accordance with additional or alternative embodiments, the media receiving device includes at least one of: a mobile phone, a mobile tablet, and a computer.

In accordance with additional or alternative embodiments, the media receiving device includes an application, the switching between the obscured mode and the un-obscured mode and the transmitting of the obscured signal and the un-obscured signal completed in the application.

According to another aspect of the disclosure a method of operating a media system including a processing device and a media receiving device is provided. The media receiving device including at least one of a mute mode and an obscured mode. The method includes a step for transcoding, with the processing device, a digital data from a first format to a second format. The processing device is configured to transmit the digital data in the second format to the media receiving device. The method includes a step for switching the media receiving device to at least one of the mute mode and the obscured mode. The media receiving device is configured to transmit at least one of a mute signal and an obscured signal to the processing device when switched to at least one of the mute mode and the obscured mode. The method includes a step for discontinuing the transcoding and transmitting of at least a portion of the digital data by processing device when receiving at least one of the mute signal and the obscured signal.

In accordance with additional or alternative embodiments, the digital data includes an audio component, the processing device configured to discontinue the transcoding and transmitting of the audio component when receiving the mute signal.

In accordance with additional or alternative embodiments, the digital data includes a video component, the processing device configured to discontinue the transcoding and transmitting of the video component when receiving the obscured signal.

In accordance with additional or alternative embodiments, the media receiving device includes an application, the switching between at least one of: the mute mode and the un-mute mode, and the obscured mode and the un-obscured mode, and the transmitting of at least one of: the mute signal and the un-mute signal, and the obscured signal and the un-obscured signal completed in the application

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

FIG. 3 is a flow diagram illustrating a method of operating a media system including a processing device and a media receiving device in accordance with one aspect of the disclosure.

DETAILED DESCRIPTION

A media system and a method for operating such a media system are provided. The system and method make it possible to reduce unnecessary transcoding and transmitting of digital data when the digital data is not being utilized by the media receiving device. This reduction of unnecessary processing may be possible by configuring the media receiving device to send a signal to the processing device when the media receiving device is in at least one of a mute mode and an obscured mode. The processing device may be configured to stop transcoding and transmitting at least a portion of the digital when receiving the signal from the media receiving device. For example, if the signal indicates that the media receiving device is in a mute mode, then the processing device may stop transcoding and transmitting the audio portion of the digital data. Conversely, if the signal indicates that the media receiving device is in an obscured mode, then the processing device may stop transcoding and transmitting the video portion of the digital data. It should be appreciated that both the audio components and the video components of the digital data may not be transcoded or transmitted in certain instances. However, there may be instances in which at least one of the audio components and the video components are transcoded and transmitted while the other is not. For example, the audio components of the digital data may be transcoded and transmitted while the video components are not.

Instead of transcoding and transmitting all of the digital data (e.g., both the audio components and the video components) when the media receiving device is muted (e.g., where the audio portion is not being utilized) or obscured (e.g., where the video portion is not being utilized), the system and method described herein selectively control what portion(s) (e.g., the audio and/or the video) are transcoded and transmitted. As such, the system and method described herein may help conserve both bandwidth (when avoiding unnecessary transmitting) and computing cycles (when avoiding unnecessary transcoding) at the processing device (e.g., the server). It is envisioned that the system and method described herein may be useful in a wide-range of different industries (e.g., security monitoring, digital fitness, web-based communications, entertainment streaming, etc.). For example, in the security monitoring industry it may be beneficial to not process (e.g., transcode or transmit) the audio portion of the digital data (e.g., captured by the security cameras) if the media receiving device (e.g., a mobile phone, mobile tablet, or computer) is muted. It is envisioned that the system and method described herein may be exponentially beneficial to industries in which a vast number of different media receiving devices are connected to a given processing device (e.g., a server) to receive transcoded audio and/or video from the processing device.

Figure 1:
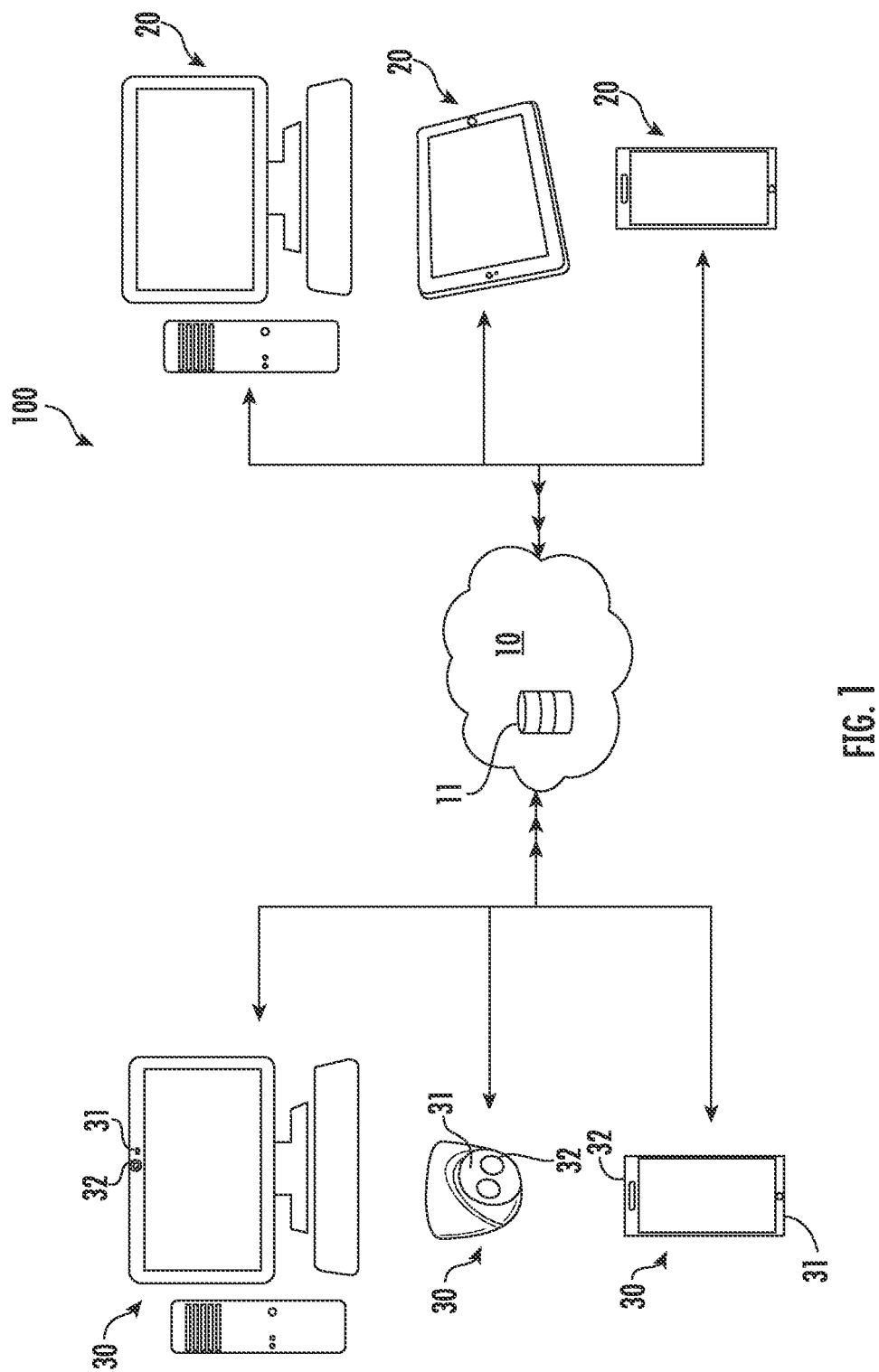
FIG. 1 is a schematic illustration of a first embodiment of a media system with a processing device and a media receiving device in accordance with one aspect of the disclosure.

With reference now to the Figures, a schematic illustration of a first embodiment of the media system 100 is shown in FIG. 1. As shown in FIG. 1, the media system 100 may include a processing device 10 (e.g., depicted as a cloud-based network 10, which may include at least one server 11), and at least one media receiving device 20 (e.g., depicted as a mobile phone, mobile tablet, and a computer). The processing device 10 may be configured to transcode digital data (e.g., at least one of digital audio and digital video) from a first format to a second format. The processing device 10 may be configured to transmit the digital data in the second format (e.g., supported by the media receiving device 20). The media receiving device 20 may be in communication with the processing device 10 (e.g., through one or more wired or wireless connections). The media receiving device 20 may include at least one of a mute mode and an obscured mode. The media receiving device 20 may be viewed as being in the mute mode when set to not output (e.g., audibly) digital audio. For example, the volume on the media receiving device 20 may be set to zero when being in the mute mode. The media receiving device 20 may be viewed as being in an obscured mode when set to not output (e.g., visually) digital video. For example, the display of the media receiving device 20 may be minimized or covered (e.g., at least majorly, such as greater than 50%) when being in the obscured mode.

The media receiving device 20 may be configured to transmit a signal to the processing device 10 when switched to at least one of the mute mode and the obscured mode. This signal may indicate to the processing device 10 that the media receiving device 20 is in either the mute mode or the obscured mode. The processing device 10 may be configured to stop transcoding and transmitting at least a portion of the digital data to the media receiving device 20 when receiving the signal. For example, the processing device 10 may stop transcoding and transmitting the audio component of the digital data when receiving a signal indicating that the media receiving device 20 is in a mute mode, and may stop transcoding and transmitting the video component of the digital data when receiving a signal indicating that the media receiving device 20 is in an obscured mode.

In certain instances, the media receiving device 20 may be configured to transmit another signal to the processing device 10 when switched to at least one of an un-mute mode and an un-obscured mode. This signal may indicate to the processing device 10 that the media receiving device 20 is either no longer in the mute mode (e.g., is in the un-mute mode) or is no longer in the obscured mode (e.g., is in the un-obscured mode). The processing device 10 may be configured to resume transcoding and transmitting at least a portion of the digital data to the media receiving device 20 when receiving a signal that indicates that the media receiving device 20 is in either the un-mute mode or the un-obscured mode. For example, processing device 10 may resume transcoding and transmitting the audio component of the digital data when the media receiving device 20 is switched to no longer be in the mute mode (e.g., the volume is increased to no longer be at zero), and may resume transcoding and transmitting the video component of the digital data when the media receiving device 20 is switched to no longer be in the obscured mode (e.g., the display is opened up and is no longer minimized or covered up). It should be appreciated that there may be a delay (albeit slight) between the switching to either the un-mute mode and/or the un-obscured mode and the receiving of the digital data by the media receiving device 20.

As described above and shown in FIG. 1, the processing device 10 may be configured as a network 10, which may include at least one server 11. The transcoding and transmitting of the digital data may be completed in the server 11. For example, the server 11 may be an application server, which is designed to run an application in real-time. It should be appreciated that the server 11 may be either local (e.g., co-located with the media receiving device 20), or remote (e.g., cloud-based). As shown in FIG. 1, the processing device 10 may be in communication with a media output device 30. The media output device 30 may be configured to transmit the digital data (e.g., which may include an audio component and/or a video component) to the processing device 10. For example, the media output device 30 may be configured as a security camera that includes a microphone 31 (e.g., configured to capture digital audio) and/or an optical lens 32 (e.g., configured to capture digital video). Although the media output device 30 may be a security camera in certain instances, it should be appreciated that the media output device 30 may take the form of any device capable of capturing and transmitting digital data to a processing device 10. Regardless of the specific configuration, the media output device 30 may capture and transmit the digital data to the processing device 10 in the first format. This digital data may be transferred to the processing device 10 using any suitable wireless and/or wired connection. For example, the media output device 30 may communicate (e.g., to transmit the digital data) with the processing device 10 through a local gateway (e.g., a router) using a short-range wireless technology (e.g., Wi-Fi, Bluetooth, Bluetooth Low Energy (BTLE), Zigbee, and infrared), or a wired connection (e.g. UART, Serial, Fiber-optic, SPI or Ethernet cable). It should be appreciated that the media output device 30 may communicate with the local gateway (e.g., the router) using an intermediate device (e.g., a controller). The processing device 10 may be configured to decode the digital data from the first format to an intermediate uncompressed format (e.g., PCM for audio, or YUV for video), and then encode the digital data into the second format (e.g., the target format, which is supported by the media receiving device 20).

It is envisioned that the processing device 10 may be capable of seamlessly communicating with the media receiving device 20 (e.g., through an application, which may be either web-based, or downloaded to the memory of the media receiving device 20). For example, the media receiving device 20 may be a mobile phone, or mobile tablet such as those running the Android™ operating system of Google Inc., of Mountain View, Calif., or the iOS™ operating system of Apple Inc., of Cupertino, Calif., or the BlackBerry™ operating system of BlackBerry Limited, of Waterloo, Ontario. The media receiving device 20 may be programmed with the application (e.g., an app) that allows the media receiving device 20 to be in communication with the processing device 10 (e.g., to receive and display digital data in the form of audible sound and/or a viewable image on the media receiving device 20). It should be appreciated that the media receiving device 20 may receive the digital data in the second format.

In certain instances, the switching between modes may be completed in the application. For example, the application may provide for at least one radio button to be displayed on the screen of the media receiving device 20, which may enable the user of the media receiving device 20 to toggle between the mute mode and the un-mute mode and/or the obscured mode and the un-obscured mode. Using this radio button may activate a signal (e.g., the mute signal, the un-mute signal, the obscured signal, and/or the un-obscured signal), which may be transmitted (e.g., through the application to the server(s) 11) to the processing device 10. As stated above, the processing device 10 may be configured to stop transcoding and transmitting at least a portion of the digital data when receiving the signal (e.g., stop transcoding and transmitting digital audio when receiving the mute signal, and stop transcoding and transmitting digital video when receiving the obscured signal). Although the obscured mode and un-obscured mode may be switched using a radio button in the application in certain instances, it is envisioned that automatic detection may be possible. For example, an obscured signal may be automatically triggered when the application is minimized on the media receiving device 20 (e.g., without having to select a radio button). Conversely, an un-obscured signal may be automatically triggered when the application is opened on the media receiving device 20. A similar automatic detection may also be possible with the switching between the mute mode and the un-mute mode. For example, a mute signal may be automatically triggered when the volume on the media receiving device 20 is set to zero (e.g., either on the device itself or in the application). Conversely, an un-mute signal may be automatically triggered when the volume on the media receiving device 20 is increased above zero. As mentioned above, there may be a delay (albeit slight) between the switching to either the un-mute mode and/or the un-obscured mode and the receiving of the digital data by the media receiving device 20.

Figure 2:
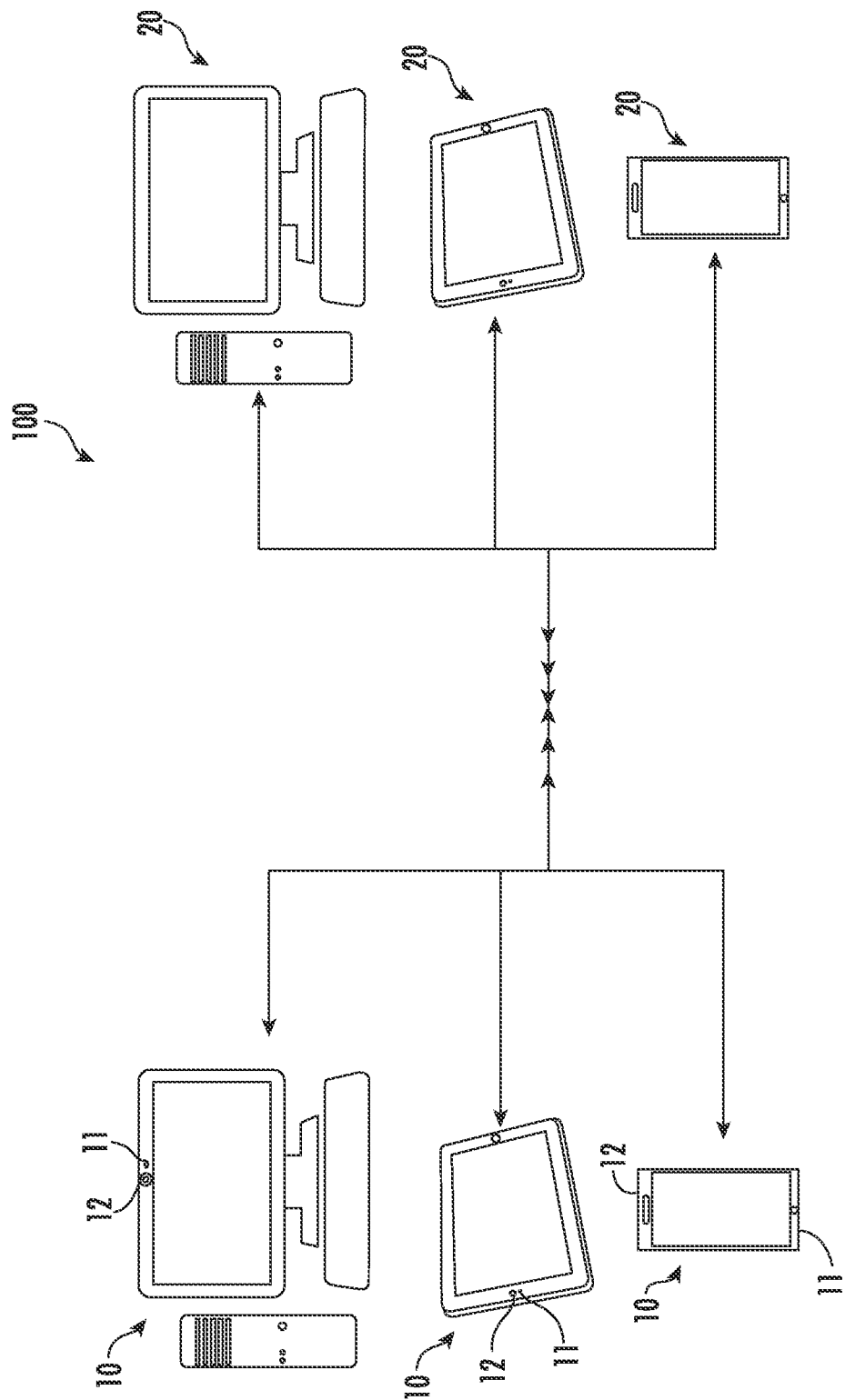
FIG. 2 is a schematic illustration of a second embodiment of a media system with a processing device and a media receiving device in accordance with one aspect of the disclosure.

Although described above and shown in FIG. 1 that the digital data may originate from a media output device 30, which may be separate from the processing device 10. It is envisioned that the processing device 10 and the media output device 30 may be configured as one piece of hardware. For example, as shown in FIG. 2, which depicts a schematic illustration of a second embodiment of the media system 100, the processing device 10 may include at least one of a mobile phone, a mobile tablet, and a computer. The transcoding and transmitting may be completed internally within the processing device 10 (e.g., instead of in the server 11 as shown in FIG. 1). To complete the processing from the first format to the second format, the processing device 10 may include a processor. The processor may be, but is not limited to, a single-processor or multi-processor system of any of a wide array of possible architectures, including field programmable gate array (FPGA), a central processing unit (CPU), application specific integrated circuits (ASIC), digital signal processor (DSP) or graphics processing unit (GPU) hardware arranged homogenously or heterogeneously. When configured as one piece of hardware, the processing device 10 may include a microphone 11 (e.g., configured to capture digital audio) and/or an optical lens 12 (e.g., configured to capture digital video). The processing device 10 may be configured to decode the digital data from the first format (e.g., of which it is captured in) to an intermediate uncompressed format (e.g., PCM for audio, or YUV for video), and then encode the digital data into the second format (e.g., the target format, which is supported by the media receiving device 20). This digital data (e.g., in the second format) may be transmitted to the media receiving device 20 (e.g., either directly via a cellular network, or indirectly through an application, which may be supported by an application server (not shown in FIG. 2)).

As with the first embodiment (depicted in FIG. 1), the second embodiment (depicted in FIG. 2) may provide for the switching between modes in the application. For example, the application may provide for at least one radio button to be displayed on the screen of the media receiving device 20, which may enable the user of the media receiving device 20 to toggle between the mute mode and the un-mute mode and/or the obscured mode and the un-obscured mode. Using this radio button may activate a signal (e.g., the mute signal, the un-mute signal, the obscured signal, and/or the un-obscured signal), which may be transmitted (e.g., through the application) to the processing device 10. As stated above, the processing device 10 may be configured to stop transcoding and transmitting at least a portion of the digital data when receiving the signal (e.g., stop transcoding and transmitting digital audio when receiving the mute signal, and stop transcoding and transmitting digital video when receiving the obscured signal). Although the obscured mode and un-obscured mode may be switched using a radio button in the application in certain instances, it is envisioned that automatic detection may be possible. For example, an obscured signal may be automatically triggered when the application is minimized on the media receiving device 20 (e.g., without having to select a radio button). Conversely, an un-obscured signal may be automatically triggered when the application is opened on the media receiving device 20. A similar automatic detection may also be possible with the switching between the mute mode and the un-mute mode. For example, a mute signal may be automatically triggered when the volume on the media receiving device 20 is set to zero (e.g., either on the device itself or in the application). Conversely, an un-mute signal may be automatically triggered when the volume on the media receiving device 20 is increased above zero. As mentioned above, there may be a delay (albeit slight) between the switching to either the un-mute mode and/or the un-obscured mode and the receiving of the digital data by the media receiving device 20.

It is envisioned that the above-described media system 100 may help reduce unnecessary transcoding and transmitting of digital data when the digital data is not being utilized, which may improve the operation of the processing device 10 (e.g., by freeing up computing cycles and bandwidth on the processing device 10). By freeing up computing cycles and bandwidth on the processing device 10, the processing device 10 may be better able to serve other connected devices, which ideally are utilizing the received digital data. For example, instead of transcoding and transmitting digital data to all connected devices all the time, the media system 100, as described above, may conserve resources by transcoding and transmitting based upon the wants and needs of the media receiving devices 20 (e.g., only transcode and transmit digital audio to media receiving devices 20 that are not muted, and only transcode and transmit digital video to media receiving devices 20 that are displaying the video).

An exemplary method 300 of operating the media system 100 is illustrated in FIG. 3. The method 300 may be performed, for example, using either the first embodiment of the media system 100 (shown in FIG. 1) or the second embodiment of the media system 100 (shown in FIG. 2), both of which include a processing device 10 and a media receiving device 20. As mentioned above, the media receiving device 20 may include at least one of: a mute mode and an obscured mode. The media receiving device 20 may be viewed as being in the mute mode when set to not output (e.g., audibly) digital audio. For example, the volume on the media receiving device 20 may be set to zero when being in the mute mode. The media receiving device 20 may be viewed as being in an obscured mode when set to not output (e.g., visually) digital video. For example, the display of the media receiving device 20 may be minimized or covered (e.g., at least majorly, such as greater than 50%) when being in the obscured mode.

The method 300 includes step 310 for transcoding, with the processing device 10, a digital data from a first format to a second format, the processing device 10 configured to transmit the digital data in the second format to the media receiving device 20. The method 300 includes step 320 for switching the media receiving device 20 to at least one of the mute mode and the obscured mode, the media receiving device 20 is configured to transmit (e.g., through an application, etc.) at least one of a mute signal and an obscured signal to the processing device 10 when switched to at least one of the mute mode and the obscured mode. As shown in FIG. 3, if switched to the mute mode a mute signal may be transmitted to the processing device 10 (shown by step 330), and if switched to the obscured mode an obscured signal may be transmitted to the processing device 10 (shown by step 340). The method 300 includes steps 350 and 360 for discontinuing the transcoding and transmitting of at least a portion of the digital data by the processing device when receiving at least one of the mute signal and the obscured signal. As shown in FIG. 4, the transcoding and transmitting of the audio component of the digital data may be discontinued when receiving the mute signal (shown by step 350), and the transcoding and transmitting of the video component of the digital data may be discontinued when receiving the obscured signal (shown by step 360). As mentioned above, the transcoding and transmitting of the digital data may resume when no longer muted and/or obscured (e.g., which may trigger the transmission of an un-mute signal and/or an un-obscured signal to the processing device 10).

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A security monitoring system, comprising:
   a camera configured to transmit digital data in a first format, the digital data comprising an audio component and a video component;
   a server side processing device in communication with the camera, the server side processing device configured to transcode the digital data, received from the camera, from the first format to a second format, the server side processing device configured to transmit the digital data in the second format; and
   a user side media receiving device in communication with the server side processing device, the user side media receiving device configurable to switch between a mute mode and an un-mute mode, wherein
   the user side media receiving device is configured to:
   responsive to a user of the user side media receiving device switching the user side media receiving device to the mute mode, transmit a mute signal to the server side processing device, and wherein
   the server side processing device is configured to stop transcoding and transmitting the audio component of the digital data to the user side media receiving device when the mute signal is received from the user side media receiving device and continue transcoding and transmitting the video component of the digital data to the user side media receiving device.

2. The security monitoring system of claim 1, wherein the user side media receiving device is configured to, responsive to the user switching the user side media receiving device to the un-mute mode, transmit an un-mute signal to the server side processing device, and wherein the server side processing device is configured to resume transcoding and transmitting the audio component of the digital data to the user side media receiving device when receiving the un-mute signal.

3. The security monitoring system of claim 1, wherein the camera comprises a microphone configured to capture the audio component of the digital data.

4. The security monitoring system of claim 1, wherein the transcoding and transmitting are completed in the server side processing device.

5. The security monitoring system of claim 1, wherein the sever side processing device comprises at least one of: a mobile phone, a mobile tablet, or a computer, and wherein the transcoding and transmitting are completed in at least one of: the mobile phone, the mobile tablet, or the computer.

6. The security monitoring system of claim 2, wherein the user side media receiving device comprises at least one of: a mobile phone, a mobile tablet, or a computer.

7. The security monitoring system of claim 6, wherein the user side media receiving device comprises an application, and wherein the switching between the mute mode and the un-mute mode and the transmitting of the mute signal and the un-mute signal are completed in the application.

8. A security monitoring system, comprising:
   a camera configured to transmit digital data in a first format, the digital data comprising an audio component and a video component;
   a server side processing device in communication with the camera, the server side processing device configured to transcode the digital data, received from the camera, from the first format to a second format, the server side processing device configured to transmit the digital data in the second format; and
   a user side media receiving device in communication with the server side processing device, the user side media receiving device configurable to switch between an obscured mode, an un-obscured mode, a mute mode, and an un-mute mode, wherein the user side media receiving device is configured to:
   responsive to a user of the user side media receiving device switching the user side media receiving device to the obscured mode, transmit an obscured signal to the server side processing device, and wherein
   the server side processing device is configured to:
   stop transcoding and transmitting the video component of the digital data to the user side media receiving device when the obscured signal is received from the user side media receiving device and continue transcoding and transmitting the audio component of the digital data to the user side media receiving side.

9. The security monitoring system of claim 8, wherein the user side media receiving device is configured to, responsive to the user switching the user side media receiving device to the un-obscured mode, transmit an un-obscured signal to the server side processing device, and wherein the server side processing device is configured to resume transcoding and transmitting the video component of the digital data to the user side media receiving device when receiving the un-obscured signal.

10. The security monitoring system of claim 8, wherein the transcoding and transmitting are completed in the server side processing device.

11. The security monitoring system of claim 8, wherein the server side processing device comprises at least one of: a mobile phone, a mobile tablet, or a computer, and wherein the transcoding and transmitting are completed in at least one of: the mobile phone, the mobile tablet, or the computer.

12. The security monitoring system of claim 9, wherein the user side media receiving device comprises at least one of: a mobile phone, a mobile tablet, or a computer.

13. The security monitoring system of claim 12, wherein the user side media receiving device comprises an application, and wherein the switching between the obscured mode and the un-obscured mode and the transmitting of the obscured signal and the un-obscured signal are completed in the application.

14. A method of operating a security monitoring system comprising a camera, a server side processing device, and a user side media receiving device, the method comprising:

transcoding, with the server side processing device, digital data, transmitted by the camera in a first format, from the first format to a second format, the server side processing device configured to transmit the digital data in the second format to the user side media receiving device, wherein the user side media receiving device is configurable to switch between a mute mode, an un-mute mode, an obscured mode, and an un-obscured mode;

responsive to a user of the user side media receiving device switching the user side media receiving device to the mute mode or the obscured mode, receiving, at the server side processing device, at least one of a mute signal and an obscured signal from the user side media receiving device; and discontinuing the transcoding and transmitting of at least a portion of the digital data by the server side processing device when at least one of the mute signal and the obscured signal is received and continuing the transcoding and transmitting of another portion of the digital data, wherein the portion of the digital data comprises one of: an audio component of the digital data or a video component of the digital data, and the other portion of the digital data comprises another one of the audio component or the video component.

15. The method of claim 14, wherein the server side processing device is configured to discontinue the transcoding and transmitting of the audio component when receiving the mute signal and continue the transcoding and transmitting of the video component.

16. The method of claim 14, wherein the server side processing device is configured to discontinue the transcoding and transmitting of the video component when receiving the obscured signal and continue the transcoding and transmitting of the audio component.

17. The method of claim 14, wherein the user side media receiving device comprises an application, and the switching between at least one of: the mute mode and the un-mute mode, and the obscured mode and the un-obscured mode, and the transmitting of at least one of: the mute signal and an un-mute signal, and the obscured signal and an un-obscured signal are completed in the application.

* * * * *